Aug. 17, 1948.  L. SPRARAGEN  2,447,469
QUADRANT CONTROL
Filed Oct. 20, 1944  2 Sheets-Sheet 1
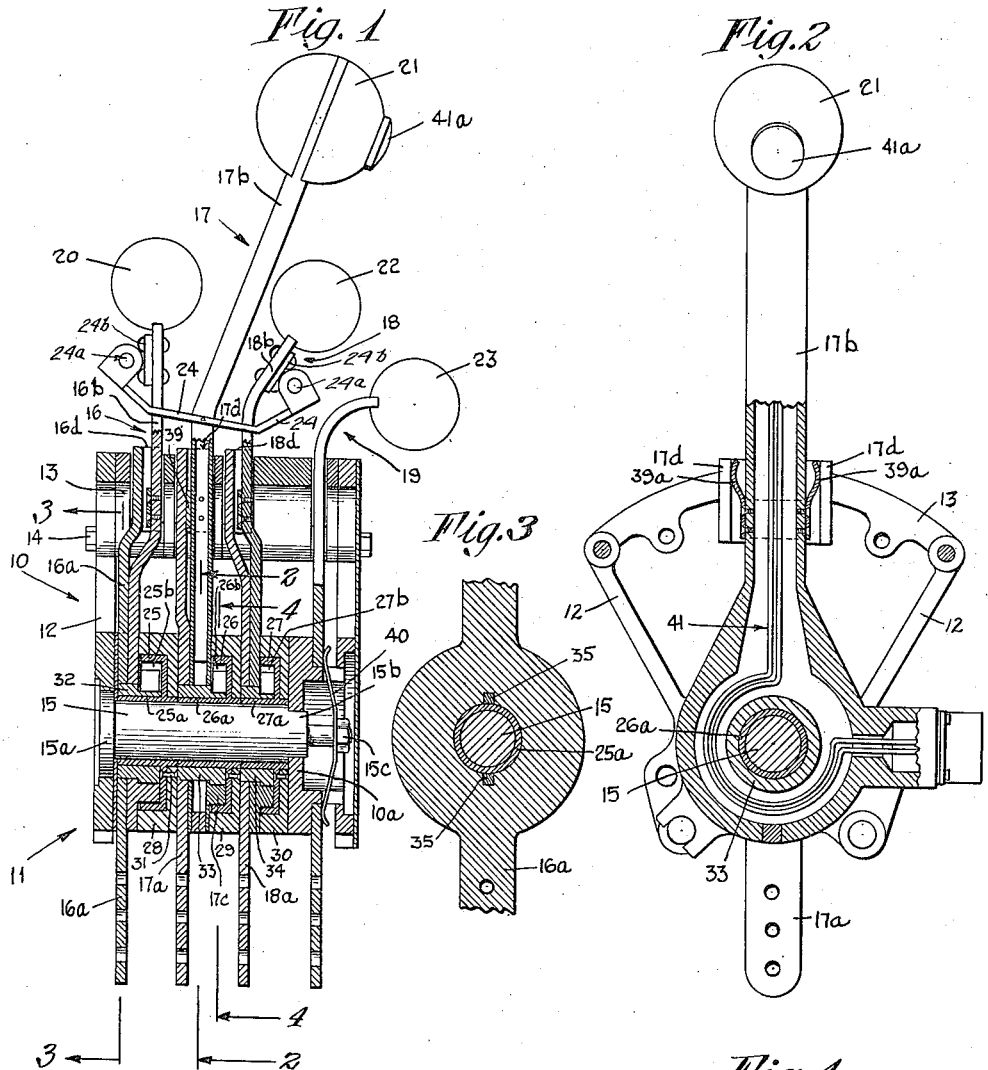
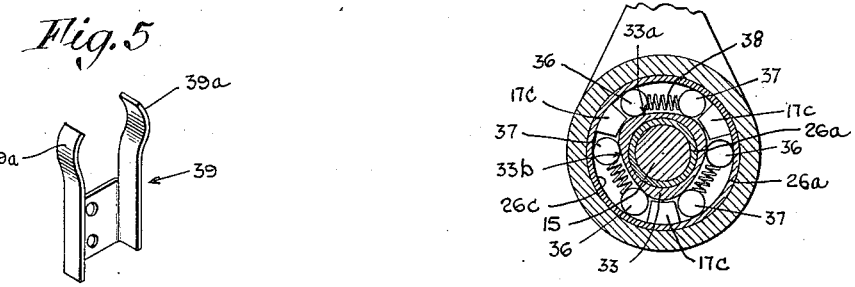
INVENTOR
Louis Spraragen
BY Johnson + Kline
ATTORNEYS

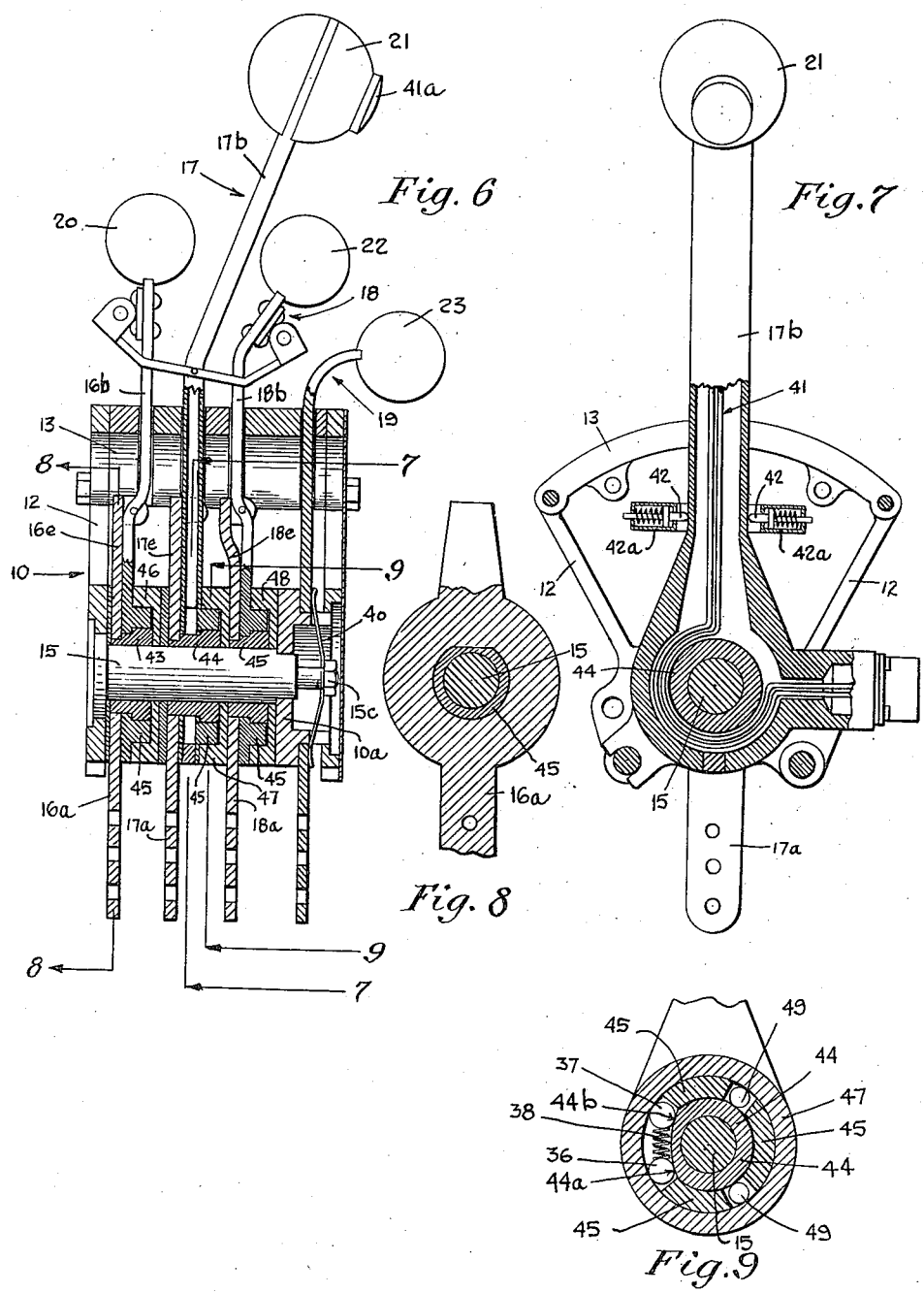

Patented Aug. 17, 1948

2,447,469

UNITED STATES PATENT OFFICE 2,447,469

QUADRANT CONTROL

Louis Spraragen, Bridgeport, Conn., assignor to Automatic Locking Devices, Incorporated, Bridgeport, Conn., a corporation of Connecticut Application October 20, 1944, Serial No. 559,633

15 Claims. (Cl. 74—480)

This invention relates to quadrant-type controls employing juxtaposed operating levers, such as are used in aircraft and the like, and more particularly to a locking quadrant-type control.

An object of the invention is to provide a quadrant-control wherein the driving lever arms may be positively locked in any adjusted position so that the instrumentalities actuated by the arms may not inadvertently shift or become altered, yet the movement required of an operator to operate the control, including unlocking and locking, need be no more than those required to operate a non-locking control, the speed of operation also being just as great.

This is accomplished by a novel combination, with a control quadrant frame, of a plurality of locking means and two-part operating levers so arranged that the driving parts of the levers, which are connected to the instrumentalities to be actuated and controlled, are normally locked to the frame so that they resist, without movement, all forces originating at the instrumentalities, yet they may be unlocked and driven by merely grasping and moving the handle parts of the levers in the same directions these latter parts would be moved if no locking means at all were employed. When the handle parts of the levers are let go of, after the desired control of the instrumentalities has been accomplished, the locking means automatically again become operative so that the instrumentalities are securely held in their new adjusted positions. Thus the movements required of the operator to actuate the control are no different from those ordinarily employed with non-locking controls, yet the instrumentalities are locked in any adjusted position, so that an improved, positive and satisfactory control is had of the latter.

In the illustrated embodiments of the invention, the frame and the driving or coupled parts of the levers have respectively cooperating spaced portions which are locked against relative movement by spring urged wedging rollers, which latter may be dislodged to unlock the said coupled parts at the initiation of the operating movements of the handle parts of the levers. The remainder of the operating movements of the handle parts drives the coupled parts by means of lost-motion driving connections between the respective parts. These lost-motion connections permit automatic locking of the coupled parts of the levers to take place after the instrumentalities have been actuated as desired and the handle parts of the levers have been let go of, spring means being provided to return the handle parts to their normal relative positions, and to move the dislodged rollers again into wedging position. The operation is such that but comparatively little pressure on the lever handles is required to unlock the rollers, yet the latter by their wedging action securely automatically lock the coupled parts of the levers after the control has been operated, so that the instrumentalities may not shift.

A manually releasable locking link interconnects the handle parts of adjacent levers so that they may be operated either simultaneously, to actuate the instrumentalities in unison, or independently to actuate the instrumentalities one at a time.

A feature of the invention is the provision of an automatic locking means as above, which is extremely small and compact so that the overall dimensions of the quadrant control of this invention need not be larger than the dimensions of the usual non-locking type.

Another feature of the invention is the provision in a quadrant-control, of juxtaposed wedging-type locking mechanisms in which the parts of critical dimension are maintained in accurate alignment so that the operation of the control is reliable, and are shaped to permit of satisfactorily economical manufacture.

Other features and advantages will hereinafter appear.

In the accompanying drawings—

Figure 1 is a vertical axial sectional view of a quadrant-type control device illustrating one embodiment of the invention.

Fig. 2 is a fragmentary section taken on the line 2—2 of Fig. 1.

Fig. 3 is a fragmentary section taken on the line 3—3 of Fig. 1.

Fig. 4 is a fragmentary section taken on the line 4—4 of Fig. 1.

Fig. 5 is a perspective view of a flat spring carried by the two-part levers.

Fig. 6 is a vertical axial section of a quadrant-type control illustrating another embodiment of the invention.

Fig. 7 is a fragmentary section taken on the line 7—7 of Fig. 6.

Fig. 8 is a fragmentary section taken on the line 8—8 of Fig. 6, and

Fig. 9 is a fragmentary section taken on the line 9—9 of Fig. 6.

The embodiment of the invention illustrated in Figs. 1 through 5 comprises a quadrant-shaped frame 10 having an apex portion 11 and substantially radial supports 12 which carry a semi-cylindrical or curved portion 13. The frame 10 may be constructed in any suitable manner, but preferably it is made up of a plurality of stacked sections, the sections having generally similar shapes, the sections being secured together by bolts 14. The apex portions of the frame sections are apertured to receive a stud 15 about which a plurality of operating levers 16, 17, 18 and 19 are pivotally mounted, the levers extending through respective slots in the curved portion 13 of the frame, which slots may be formed by shaping the frame sections so that suitable clearances exist between them at their curved portions.

The levers 16, 17, 18 and 19 are provided with the usual knobs 20, 21, 22 and 23 respectively, and are shaped to extend in divergent directions at the exterior of the frame 10 in the usual manner. Also, the levers are provided with the usual type of manually releasable locking links 24 for connecting together the levers 16, 17 and 18 for simultaneous operation. As commonly understood in connection with quadrant-controls of the type shown, employing juxtaposed operating levers, the locking links 24 are pivotally mounted at 24a on brackets 24b secured to portions 16b and 18b of levers 16 and 18 and are normally urged into engagement with lever 17 and may be manually operated to disconnect the adjacent levers 16, 17 and 18 so that these may be operated independently of each other if desired.

According to the present invention a novel combination is provided, with the frame 10, of two-part lever construction and plurality of locking mechanisms whereby the driving parts of the levers 16, 17 and 18 are normally locked to the frame, yet may be unlocked and driven in response to operating movement of the handle parts of the levers. I apply the term "two-part" to the levers in that each lever has a driving part and a handle part which are movable independently of each other, the driving part of the lever being for connection to the instrumentality to be actuated. In this construction the handle parts of the levers are connected with the locking mechanisms and automatically release the latter at the initiation of the handle operating movement.

As seen in Fig. 1, the lever 16 has a driving part 16a extended above and below the stud 15, and a handle or operating part 16b extended generally above the stud 15. Similarly, the lever 17 has a driving part 17a and an operating part 17b and the lever 18, a driving part 18a and an operating part 18b, and the locking link 24 for the levers is carried by the operating part 17b of the lever 17, for engagement with the operating parts 16b and 18b of the adjacent levers.

Associated with the levers 16, 17 and 18 are circular housings 25, 26 and 27 respectively, the housings having aligned bearing portions 25a, 26a and 27a carried on the stud 15. The housings 25, 26 and 27 are mounted in recesses in the apex portions 28, 29 and 30 respectively of the frame 10, and are secured to said portions by rivets 31, thereby being prevented from turning.

Also, the housings 25, 26 and 27 have circular recesses 25b, 26b and 27b, the larger peripheral walls of which serve as races or tracks for cooperation with sleeves 32, 33 and 34 respectively carried on the bearing portions 25a, 26a and 27a. The control parts 16a, 17a and 18a of the levers are pivotally carried on the bearing portions 25a, 26a and 27a respectively, and are slotted to receive lugs 35 of the sleeves so that the latter are keyed to these control parts.

According to the invention, means are provided whereby the sleeves 32, 33 and 34 may be locked to the housings 25, 26 and 27 respectively so that the control parts of the levers are thereby locked to the housings and consequently to the frame 10. To accomplish this, the portions of the sleeves 32, 33 and 34 located within the recesses 25b, 26b and 27b are relieved along their peripheries to provide a plurality of pairs of oppositely directed wedging surfaces. As shown in Fig. 4, the periphery of the sleeve 33 is relieved at three equi-spaced points to provide pairs of oppositely directed wedging surfaces 33a and 33b, and pairs of rollers 36 and 37 are located between the respective pairs of wedging surfaces and the race 26c of the housing 26, the rollers being spring-urged apart by compression springs 38.

By this construction, as shown in Fig. 4, the rollers 36 are wedged between the track 26c and the wedging surfaces 33a so that the sleeve 33 is prevented from rotating in a clockwise direction. Also, the rollers 37 are wedged between the race 26c and the wedging surfaces 33b so that the sleeve 33 is prevented from rotating counter-clockwise. As a result, the control part 17a of the lever 17, being keyed to the sleeve 33 is thereby locked to the housing 26 and frame 10. In a similar manner the sleeves 32 and 34 are locked by spring-urged rollers to the housings 25 and 27 respectively, so that the control parts 16a and 18a of the levers are also locked to the housing 10.

For the purpose of rendering inoperative the locking means for the control parts of the levers at the initiation of operating movements of the handle or operating parts of said levers, the said operating parts 16b, 17b and 18b are provided with lugs extending into the recesses 25b, 26b and 27b respectively, for engaging and moving out of wedging position one or the other of the sets of rollers 36, 37 according to the direction of movement of the operating parts of the levers.

Referring to Figs. 1 and 4, the operating part 17b of the lever 17 has a plurality of lugs 17c extending into the recess 26b between adjacent pairs of rollers 36, 37. Also, at its upper end the control part 17a of the lever 17 is provided with flanges 17d, Fig. 1, extending on each side of the operating part 17b but normally spaced therefrom to provide a lost-motion driving connection thereto. The operating part 17b of the lever is provided with a flat spring 39, Figs. 1 and 5, having resilient arms 39a which yieldably hold the operating part 17b of the lever 17 in a position intermediate the flanges 17d, and the lugs 17c of the operating part 17b are positioned as shown in Fig. 4 to not engage the rollers when said operating part is in this intermediate position.

However, if the operating part 17b should be moved either one way or the other about the stud 15, the lugs 17c will move out of wedging position one or the other of the sets of rollers 36, 37. As the operating movement is continued, the operating part 17b will engage one of the flanges 17d and drive the control part 17a of the lever with it, this latter part having been released for such driving movement by the dislodging of one of the sets of rollers. It will be noted that if the operating part 17b is pulled toward the observer (Fig. 1) the rollers 37, Fig. 4, will be dislodged, releasing the sleeve 33 so that the control part 17a of the lever may move in the same direction as the operating part 17b. Or, if the operating part 17b is moved oppositely, away from the observer (Fig. 1), the wedging rollers 36 will be dislodged, Fig. 4, thereby oppositely releasing the control part 17a for movement with the operating part 17b.

In a similar manner the operating lever parts 16b and 18b are provided with lugs 16c and 18c respectively, Fig. 1, for dislodging the wedging rollers carried in the housings 25 and 27.

At the termination of movement of the operating part 17b of the lever 17, and when the knob 21 thereof is let go of, the flat spring 39 will function to centralize the operating part 17b between the lugs 17d, whereupon the compression springs 38 will restore the dislodged rollers to their wedging positions, thereby automatically locking the control part 17a of the lever in its new adjusted position.

The control parts 16a and 18a of the levers 16 and 18 are provided with flanges 16d and 18d respectively, and with flat springs 39 as shown in Fig. 1 so that the operation of these levers is similar to the lever 17.

It will be seen that by the above construction, forces which may be exerted on the lower apertured extensions of the control parts 16a, 17a and 18a of the levers (Figs. 1 and 2) by connection of same to the respective instrumentalities to be actuated, cannot cause shifting of the levers, by virtue of the locking action of the wedging rollers 36 and 37. Thus the instrumentalities connected with the levers are prevented from inadvertently shifting or changing position, and may be positively locked in any adjusted position. Before said instrumentalities may be actuated, the wedging rollers 36 or 37 must be first dislodged, and the only way this may be accomplished is by movement of the operating parts of the levers.

Since this dislodgment occurs automatically at the initiation of the operating movement of the lever parts 16b, 17b and 18b, an operator is not conscious of unlocking the control, nor is any effort required on the part of the operator to again lock the control after the desired adjustment has been made, since upon release of any one of the knobs, the flat springs 39, aided by the coil springs 38, will centralize the lever parts with respect to each other and automatically wedge the rollers into locking position. Thus the present invention provides a quadrant-type locking control, the operation of which is substantially identical, as far as the operator is concerned, with non-locking controls of this type.

If the locking link 24 is allowed to remain in the position shown in Fig. 1, the levers 16, 17 and 18 may be operated simultaneously by grasping and moving the knob 21, the unlocking and automatic relocking of the levers occurring by simultaneous relative movements between the respective lever parts. During such operation the instrumentalities controlled by the levers will be actuated in unison. If the locking link 24 is shifted so as to release the lever 16 and/or the lever 18, the operation of the levers may be carried out independently of each other.

As shown in Fig. 1, the apex portion 28 of the frame 10 may engage the control part 17a of the lever 17 and also the operating part 16b of the lever 16. Likewise, the apex portion 29 of the frame 10 may engage the control part 18a of the lever 18 and the operating part 17b of the lever 17, and the apex portion 30 of the frame may engage the operating part 18b of the lever 18. It may be seen that the control and locking mechanism as thus provided is extremely small and compact, yet provides a positive locking of the levers without altering the movements required of an operator to operate the control. The stud 15 has a shouldered head 15a recessed in one end section of the frame 10, and has at its other end a flatted portion 15b extending through and carried by the other end section 10a of the frame, this latter section also carrying the lever 19. Beyond the flatted portion 15b of the stud the latter is reduced and threaded to carry a nut 15c engaging a flat spider washer 40 functioning as a retainer for the lever 19.

The housings 25, 26 and 27, which preferably are accurately made, are separate from the sections of the frame 10 and are circular and concentric so that they may be manufactured to close tolerances with comparative ease. Also, being located directly on the stud 15, they are accurately aligned with each other and with the cooperating parts of the locking mechanism so that the control device functions at all times in a reliable manner. Also, sleeves 32, 33 and 34, which are preferably accurately made, by being carried on the bearing portions of the housings 25, 26 and 27, may always be in close alignment therewith.

As shown in Figs. 1 and 2, the operating part 17b of the lever 17 may be made tubular and may carry conductors 41 for connection with a switch button 41a located in the knob 21.

A locking quadrant-control made according to a modification of the invention is shown in Figs. 6 through 9. This control is similar in most respects to the control already described, and therefore similarly operating parts have been given similar characters. Referring to Figs. 6 and 7, the extensions 16e, 17e and 18e of the control parts 16a, 17a and 18a of the levers do not extend through the curved portion of the housing 10, but terminate short thereof and are provided with spring-urged plungers 42 for centralizing the respective parts of the levers. The housings 42a for the plungers 42 are adapted to engage at their inner ends the operating parts 16b, 17b and 18b of the levers to provide a positive driving connection between the lever parts during operation of the conutrol.

Also, the locking sleeves 43, 44 and 45, which are keyed to the control parts 16a, 17a and 18a of the levers are relieved along but a single portion of their peripheries to provide a single pair of opposed wedging surfaces. As shown in Fig. 9, the locking sleeve 44 has a single pair of wedging surfaces 44a and 44b, and a single pair of wedging rollers 36, 37 is provided, with compression spring 38. The operating part 17b of the lever 17 has comparatively large lugs 45a encircling the locking sleeve 44. In this form of the invention the apex portions 46, 47 and 48 of the frame sections directly engage the central stud 15 of the control, and said apex portions are shaped to provide locking races for the rollers 36 and 37. Additional rollers 49 are provided between the cylindrical peripheral portion of the locking sleeve 44 and the race of the apex portion 47 of the frame, the rollers 49 serving as a bearing means and not to provide locking action. Operation of this modification of the invention, shown in Figs. 6 through 9, is substantially similar to that of the form of Figs. 1 through 5, the construction of the locking mechanism about the stud 15 involving fewer parts however than in the first described form of the invention.

Variations and modifications may be made within the scope of this invention and portions of the improvements may be used without others.

I claim:

1. A control device comprising a pair of juxtaposed stationary anchorages; a pair of drive members independently pivotally mounted with respect to the anchorages; means for transmitting motion from the drive members respectively to instrumentalities to be actuated; a pair of levers respectively movably mounted with relation to the drive members; lost-motion driving connections between the drive members and levers respectively whereby the latter are movable between limits with respect to the members, and at said limits have positive driving connections with the members; means for yieldably holding the levers in positions intermediate said limits; a pair of locking means for automatically locking the drive members independently respectively to the anchorages; means for releasing one or the other of the locking means when one or the other of the levers is moved to either of its limits so that the drive member released thereby may be driven by the said lever to actuate the associated instrumentality, said lever returning to intermediate position and said locking means becoming operative again to automatically lock the drive member when the lever is released; and a manually releasable connecting link means between the levers whereby the latter may be moved simultaneously, or independently of each other, so that the said instrumentalities may be actuated in unison or seriatim.

2. A control device comprising a pair of juxtaposed stationary housings each having an aperture in one face, and having coaxial with said aperture a circular recess providing an internal cylindrical race, the apertures of the housings being in alignment; a stationary stud extending into the said apertures and secured to the housings, maintaining same in aligned juxtaposed position; a pair of sleeves rotatable about the stud, extending respectively into the recesses of the housings in spaced relation with the faces thereof, the portion of each sleeve within the associated recess having an outer periphery gradually relieved along part of its length whereby said relieved part is spaced a greater distance than the adjacent parts of the periphery from the said race; a pair of wedges located within each recess between the said race thereof and the relieved portion of the associated sleeve; means for yieldably holding apart the wedges of each pair, and for wedging them against the housing and sleeve to lock same together against relative rotation; a pair of levers pivotally mounted with respect to the housings extending adjacent the recesses therein, each lever having release means extending between the associated sleeve and race of the recess for engaging and moving one or the other of the wedges out of wedging position when the lever is moved, to unlock the sleeve for turning in one or the other direction respectively; a pair of members rotatable with respect to the housings, located respectively alongside the levers, said members being keyed respectively to the sleeves; means for yieldably holding each lever and its associated member in a predetermined relative position, the release means of the levers being located to not engage the wedges when the levers and members are in said predetermined positions so that the sleeves and members are locked to their respective housings; a lost-motion drive between each lever and associated member whereby the lever may be moved out of said predetermined relative position in either direction to thereby dislodge one of the wedges and unlock the associated sleeve and member, each lever and associated member being positively connected by the lost-motion drive when the sleeve and member are unlocked so that the lever and member may be moved simultaneously to a new position; and means for transmitting motion from the said members.

3. The invention as defined in claim 2 in which there is a manually releasable connecting link means between the levers whereby the latter may be moved simultaneously or independently of each other so that the said members may be driven in unison or seriatim.

4. A quadrant-type control for aircraft, comprising a quadrant-shaped frame having a slot extending along its curved portion; a manually operable lever pivotally mounted substantially at the apex of the frame, extending through the slot thereof to be guided thereby; a pair of members mounted adjacent the pivotal mounting for the lever, one member being rigidly secured to the frame and the other member being pivotally mouned with respect to the frame; a lost-motion driving connection between the pivotally mounted member and the lever whereby the latter is movable between limits with respect to the member and at said limits has a driving connection therewith; means for yieldably holding the lever in a position intermediate said limits; means for automatically locking the members together so that the pivotally mounted member is prevented from turning with respect to the frame; means for transmitting motion from the pivotally mounted member to an instrumentality to be actuated; and means for releasing the locking means when the lever is moved to one or the other of said limits so that the pivotally mounted member may be driven by the lever to actuate the instrumentality, said lever returning to intermediate position and said locking means becoming operative again to automatically lock the member when the lever is released.

5. A quadrant-type control for aircraft, comprising a quadrant-shaped frame having a slot extending along its curved portion; a manually operable lever pivotally mounted substantially at the apex of the frame, extending through the slot thereof to be guided thereby; a housing fixedly secured to the frame, and located adjacent the pivoted end of the lever; a member pivoting at a point adjacent the pivot of the lever, and located alongside the latter; a lost-motion driving connection between the member and the lever whereby the latter is movable between two positions with respect to the member, and at one of said positions has a driving connection with the member; means for yieldably holding the lever in the other of said positions; means for automatically locking the member to the housing against turning; means for transmitting motion from the member to an instrumentality to be actuated; and means for releasing said locking means when the lever is moved to the said one position so that the member may be driven by the lever to actuate the said instrumentality, said lever returning to the said other position and said locking means becoming operative again to automatically lock the member when the lever is released.

6. A quadrant-type control for aircraft, comprising a quadrant-shaped frame having a slot extending along its curved portion; a manually operable lever pivotally mounted substantially at the apex of the frame, extending through the slot thereof to be guided thereby; a housing fixedly secured to the frame, and located adjacent the pivoted end of the lever; a member pivoting at a point adjacent the pivot of the lever, and located alongside the latter; a lost-motion driving connection between the member and the lever whereby the latter is movable between limits with respect to the member, and at said limits has a driving connection with the member; means for yieldably holding the lever in a position intermediate said limits; means for automatically locking the member to the housing against turning; means for transmitting motion from the member to an instrumentality to be actuated; and means for releasing said locking means when the lever is moved to one or the other of said limits so that the member may be driven by the lever to actuate the said instrumentality, said lever returning to intermediate position and said locking means becoming operative again to automatically lock the member when the lever is released.

7. A quadrant-type control for aircraft, comprising a quadrant-shaped frame having a slot extending along its curved portion; a manually operable lever pivotally mounted substantially at the apex of the frame, extending through the slot thereof to be guided thereby; a housing fixedly secured to the frame, and located adjacent the pivoted end of the lever; a member pivoting at a point adjacent the pivot of the lever, and located alongside the latter; a lost-motion driving connection between the member and lever whereby the latter is movable between limits with respect to the member, and at said limits has a driving connection with the member; means for yieldably holding the lever in a position intermediate said limits; means for automatically locking the member to the housing against turning in one direction; means for automatically locking the member to the housing against turning in the other direction; means for transmitting motion from the member to an instrumentality to be actuated; and means for releasing one or the other of said locking means when the lever is moved to one or the other of said limits so that the member may be driven by the lever to actuate the said instrumentality, said lever returning to intermediate position and said locking means becoming operative again to automatically lock the member when the lever is released.

8. A quadrant-type control for aircraft, comprising a quadrant-shaped frame having a slot extending along its curved portion; a manually operable lever pivotally mounted substantially at the apex of the frame, extending through the slot thereof to be guided thereby; a pair of members mounted adjacent the pivotal mounting for the lever, one member being rigidly secured to the frame and having a track and the other member being pivotally mounted with respect to the frame and having a pair of oppositely-directed wedging surfaces spaced from and inclined to the said track; a pair of wedging means located between said wedging surfaces and track, and means for yieldably holding the wedging means in wedging engagement with the track and wedging surfaces to lock the pair of members together; a lost-motion driving connection between the said other member and the lever whereby the latter is movable between limits with respect to the member, and at said limits has a positive driving connection with the member; means for yieldably holding the lever in a position intermediate said limits; means for transmitting motion from the said other member to an instrumentality to be actuated; and means for moving one or the other of the wedging means out of its wedging position when the lever is moved to one or the other of its limits, to thereby release the said other member and permit the lever to drive same to actuate the instrumentality, said lever automatically returning to its intermediate position and said wedging means automatically locking the members again when the lever is released.

9. A quadrant-type control for aircraft, comprising a quadrant-shaped frame having a slot extending along its curved portion; a manually operable lever pivotally mounted substantially at the apex of the frame, extending through the slot thereof to be guided thereby; a housing fixedly secured to the frame, and located adjacent the pivoted end of the lever; an arm pivoting at a point adjacent the pivot of the lever, and extending alongside the latter through the slot of the frame; a lost-motion driving connection between the end of the arm and the lever whereby the latter is movable between limits with respect to the arm, and at said limits has a driving connection with the arm; means for yieldably holding the lever in a position intermediate said limits; means for automatically locking the arm to the housing against turning in one direction; means for automatically locking the arm to the housing against turning in the other direction; an extension on said arm for transmitting motion to an instrumentality to be actuated; and means for releasing one or the other of said locking means when the lever is moved to one or the other of said limits so that the arm may be driven by the lever to actuate the said instrumentality, said lever returning to intermediate position and said locking means becoming operative again to automatically lock the arm when the lever is released.

10. A control device comprising a stationary housing having a projection comprising a bearing extending from one face, and having a continuous groove in said face encircling the projection; a sleeve rotatably carried on the projection and extending into the groove in spaced relation with the larger wall thereof, the portion of said sleeve within the groove having an outer periphery gradually relieved along part of its length whereby said relieved part is spaced a greater distance than adjacent parts of the periphery from said larger wall; a pair of wedges located within the groove between the said larger wall and the relieved portion of the sleeve; means for yieldably holding the wedges apart and wedging them against the housing and sleeve to lock same together against relative rotation; a lever pivotally mounted with respect to the housing, extending adjacent the groove therein, said lever having release means extending between the sleeve and larger wall of the groove for engaging and moving one or the other of the wedges out of wedging position when the lever is moved, to unlock the sleeve for turning in one or the other direction respectively; an arm extending alongside the lever, rotatable with respect to the housing, and keyed to the sleeve; means for yieldably holding the lever and arm in a predetermined relative position, the release means of the lever being located to not engage the wedges when the lever and arm are in said predetermined position, whereby the sleeve and arm are locked to the housing; a lost-motion drive between the lever and arm whereby the lever may be moved out of said predetermined relative position in either direction to thereby dislodge one of the wedges and unlock the sleeve and arm, the lever and arm being positively connected by the lost-motion drive when the sleeve and arm are unlocked so that both lever and arm may be moved simultaneously to a new position; and means for transmitting motion from the arm.

11. A control device comprising a pair of juxtaposed stationary housings each having an aperture in one face, and having in alignment with said aperture a tubular projection extending from said face, and a continuous groove encircling the projection, the apertures of the housing being in alignment; a pair of sleeves rotatably carried one on each projection, each sleeve extending into the continuous groove of the associated housing in spaced relation with the larger wall thereof, the portion of each sleeve within the groove having an outer periphery gradually relieved along part of its length whereby said relieved part is spaced a greater distance than the adjacent parts of the periphery from the said larger wall; a pair of wedges located within each groove between the said larger wall thereof and the relieved portion of the associated sleeve; means for yieldably holding apart the wedges of each pair, and for wedging them against the housing and sleeve to lock same together against relative rotation; a pair of levers pivotally mounted with respect to the housings, extending adjacent the grooves therein, each lever having release means extending between the associated sleeve and larger wall of the groove for engaging and moving one or the other of the wedges out of wedging position when the lever is moved, to unlock the sleeve for turning in one or the other direction respectively; a pair of arms rotatable with respect to the housings, extending respectively alongside the levers, said arms being keyed respectively to the sleeves; means for yieldably holding each lever and its associated arm in a predetermined relative position, the release means of the levers being located to not engage the wedges when the levers and arms are in said predetermined positions so that the sleeves and arms are locked to their respective housings; a lost-motion drive between each lever and associated arm whereby the lever may be moved out of said predetermined relative position in either direction to thereby dislodge one of the wedges and unlock the associated sleeve and arm, each lever and associated arm being positively connected by the lost-motion drive when the sleeve and arm are unlocked so that the lever and arm may be moved simultaneously to a new position; means for transmitting motion from the arms; and a stud extending into the tubular projections and apertures of the housings for maintaining the latter in aligned juxtaposed position.

12. The invention as defined in claim 11, in which one of the arms is located adjacent one face of the housing associated with the other arm, said face functioning as a bearing surface for maintaining alignment of the arm.

13. A control device comprising a stationary housing having a cylindrical projection extending from one face, and having an annular groove in said face, encircling the projection; a sleeve rotatably carried on the projection and extending into the groove in spaced relation with the larger wall thereof, the portion of said sleeve within the groove having an outer periphery gradually relieved along part of its length whereby said relieved part is spaced a greater distance than adjacent parts of the periphery from the said larger wall; a pair of wedging rollers located within the groove between the said larger wall and the relieved portion of the sleeve; a spring yieldably holding the rollers apart and wedging them against the housing and sleeve to lock same together against relative rotation; a lever pivotally carried by the sleeve adjacent the groove in the housing, said lever having a pair of lugs extending between the sleeve and larger wall of the groove for engaging and moving one or the other of the rollers out of wedging position when the lever is moved, to unlock the sleeve for turning in one or the other direction respectively; an arm extending alongside the lever, rotatable with respect to the cylindrical projection, and keyed to the sleeve; means for yieldably holding the lever and arm substantially in alignment, the lugs on the lever being located so that they do not engage the wedging rollers when the lever and arm are aligned, so that the sleeve and lever are locked to the housing; a lost-motion drive between the lever and arm whereby the lever may be moved out of alignment with the arm in either direction to thereby dislodge one of the rollers and unlock the sleeve and arm, the lever and arm being positively connected by the lost-motion drive when the sleeve and arm are unlocked so that both lever and arm may be moved simultaneously to a new position; and means for transmitting motion from the arm.

14. A control device comprising a pair of juxtaposed stationary housings each having an aperture extending between opposite faces, and having in one face coaxial with said aperture a circular counterbore providing an internal cylindrical race, the apertures of the housings being in alignment; a stationary stud passing through the said apertures and secured to the housings, maintaining same in aligned juxtaposed position; a pair of sleeves rotatably carried on the stud, extending respectively into the counterbores of the housings in spaced relation with the faces thereof, the portion of each sleeve within the associated counterbore having an outer periphery gardually relieved along part of its length whereby said relieved part is spaced a greater distance than the adjacent parts of the periphery from the said race; a pair of wedges located within each counterbore between the said race thereof and the relieved portion of the associated sleeve; means for yieldably holding apart the wedges of each pair, and for wedging them against the housing and sleeve to lock same together against relative rotation; a pair of levers pivotally mounted with respect to the housings, and extending adjacent the counterbores therein, each lever having laterally projecting release means extending between the associated sleeve and race of the counterbore for engaging and moving one or the other of the wedges out of wedging position when the lever is moved, to unlock the sleeve for turning in one or the other direction respectively; a pair of members rotatable with respect to the housings, located respectively alongside the levers, said members being keyed respectively to the sleeves; means for yieldably holding each lever and its associated member in a predetermined relative position, the release means of the levers being located to not engage the wedges when the levers and members are in said predetermined positions so that the sleeves and members are locked to their respective housings; a lost-motion drive between each lever and associated member whereby the lever may be moved out of said predetermined relative position in either direction to thereby dislodge one of the wedges and unlock the associated sleeve and member, each lever and associated member being positively connected by the lost-motion drive when the sleeve and member are unlocked so that the lever and member may be moved simultaneously to a new position; and means for transmitting motion from the said members.

15. A control device comprising a pair of juxtaposed stationary housings each having an aperture in one face and having coaxial with said aperture a circular recess providing an internal cylindrical race, the apertures of the housings being in alignment; a stationary stud extending into the said apertures and secured to the housings, maintaining same in aligned juxtaposed position; a pair of sleeves rotatably carried by and bearing on the stud, extending respectively into the recesses of the housings in spaced relation with the faces thereof, the portion of each sleeve within the associated recess having an outer periphery gradually relieved along part of its length whereby said relieved part is spaced a greater distance than the adjacent parts of the periphery from the said race; a pair of wedging rollers located within each recess between the said race thereof and the relieved portion of the associated sleeve; compression springs for yieldably holding apart the rollers of each pair, and for wedging the rollers against the housing and sleeve to lock same together against relative rotation; a pair of levers pivotally mounted with respect to the housings, extending adjacent the recesses therein, each lever having a lateral extension projecting between the associated sleeve and race of the recess for engaging and moving one or the other of the rollers out of wedging position when the lever is moved, to unlock the sleeve for turning in one or the other direction respectively; a pair of arms rotatable with respect to the housings, located respectively alongside the levers, said arms being keyed respectively to the sleeves; spring means for yieldably holding each lever and its associated arm in a predetermined relative position, the extensions of the levers being located to not engage the rollers when the levers and arms are in said predetermined positions so that the sleeeves and arms are locked to their respective housings; a lost-motion drive between each lever and associated arm whereby the lever may be moved out of said predetermined relative position in either direction to thereby dislodge one of the rollers and unlock the associated sleeve and arm, each lever and associated arm being positively connected by the lost-motion drive when the sleeve and arm are unlocked so that the lever and arm may be moved simultaneously to a new position; and extensions on the arms for transmitting motion therefrom.

LOUIS SPRARAGEN.

REFERENCES CITED

The following references are of record in the file of this patent:

UNITED STATES PATENTS

| Number | Name | Date |
| --- | --- | --- |
| 588,598 | Parsons | Aug. 24, 1897 |
| 1,584,358 | Dement | May 11, 1926 |
| 1,889,295 | Rosatelli | Nov. 29, 1932 |
| 1,990,153 | Woolson | Feb. 5, 1935 |
| 2,071,063 | Florez et al. | Feb. 16, 1937 |
| 2,359,392 | Shoemaker | Oct. 3, 1944 |